United States Patent
Patel et al.

(10) Patent No.: US 8,392,107 B2
(45) Date of Patent: Mar. 5, 2013

(54) SUB-ROOM-LEVEL INDOOR LOCATION SYSTEM USING POWER LINE POSITIONING

(75) Inventors: Shwetak N. Patel, Atlanta, GA (US); Khai N. Truong, Atlanta, GA (US); Gregory D. Abowd, Atlanta, GA (US); Thomas Robertson, Atlanta, GA (US); Matthew S. Reynolds, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1482 days.

(21) Appl. No.: 11/824,204

(22) Filed: Jun. 28, 2007

(65) Prior Publication Data

US 2008/0091345 A1  Apr. 17, 2008

Related U.S. Application Data

(60) Provisional application No. 60/817,225, filed on Jun. 28, 2006.

(51) Int. Cl.
G01C 21/30 (2006.01)
G01C 21/00 (2006.01)
G06F 17/00 (2006.01)
G01S 1/24 (2006.01)

(52) U.S. Cl. ........ 701/409; 701/434; 342/450; 342/463; 340/539.14

(58) Field of Classification Search .......... 701/207, 701/208, 300, 400, 408, 409, 430, 431, 433, 701/434, 449, 450, 469, 472, 494, 495, 445, 701/451; 455/456.1, 456.5; 342/450, 463, 342/464; 340/539.1, 539.11, 539.13, 539.14, 340/539.16
See application file for complete search history.

(56) References Cited

U.S. PATENT DOCUMENTS

| | | | |
|---|---|---|---|
| 4,804,957 | A | 2/1989 | Selph et al. |
| 4,858,141 | A | 8/1989 | Hart et al. |
| 5,409,037 | A | 4/1995 | Wheeler et al. |
| 5,441,070 | A | 8/1995 | Thompson |
| 5,635,895 | A | 6/1997 | Murr |
| 6,720,922 | B2 * | 4/2004 | Williams et al. ............... 342/465 |
| 6,728,646 | B2 | 4/2004 | Howell et al. |
| 6,839,644 | B1 | 1/2005 | Bryant et al. |
| 6,853,291 | B1 | 2/2005 | Aisa |
| 7,043,380 | B2 | 5/2006 | Rodenberg, III et al. |

(Continued)

FOREIGN PATENT DOCUMENTS

| | | |
|---|---|---|
| CN | 20121017 Y | 3/2009 |
| DE | 102007032053 | 1/2009 |

(Continued)

OTHER PUBLICATIONS

Active Bat, The BAT Ultrasonic Location. System, web.archive.org/web/2005082817471/http://www.uk.research.att.com/bat/. 2005.

(Continued)

*Primary Examiner* — Thomas Tarcza
*Assistant Examiner* — Edward Pipala
(74) *Attorney, Agent, or Firm* — Bryan Cave LLP

(57) ABSTRACT

Disclosed is an indoor location system that uses an electrical power line, power line signal injection devices, and portable position receivers (tags) to generate location data relating to positions of the tags in a structure such as a residence or business. The indoor location system fingerprinting of multiple signals transmitted along the power line to achieve sub-room-level localization of the positioning receivers. Details regarding power line positioning are described along with how it compares favorably to other fingerprinting techniques.

24 Claims, 6 Drawing Sheets

U.S. PATENT DOCUMENTS

| | | | |
|---|---|---|---|
| 7,276,915 | B1 | 10/2007 | Euler et al. |
| 7,400,986 | B2 | 7/2008 | Lathan et al. |
| 7,460,930 | B1 | 12/2008 | Vinson et al. |
| 7,493,221 | B2 | 2/2009 | Caggiano et al. |
| 7,532,896 | B2 * | 5/2009 | Friday et al. .............. 455/456.1 |
| 7,546,214 | B2 | 6/2009 | Rivers, Jr. et al. |
| 7,660,591 | B1 * | 2/2010 | Krishnakumar et al. ... 455/456.5 |
| 2001/0003286 | A1 | 6/2001 | Philippbar et al. |
| 2002/0010690 | A1 | 1/2002 | Howell et al. |
| 2002/0022991 | A1 * | 2/2002 | Sharood et al. ................. 705/14 |
| 2003/0050737 | A1 | 3/2003 | Osann et al. |
| 2003/0088527 | A1 | 5/2003 | Hung et al. |
| 2003/0193405 | A1 | 10/2003 | Hunt et al. |
| 2004/0128034 | A1 | 7/2004 | Carroll et al. |
| 2004/0140908 | A1 | 7/2004 | Gladwin et al. |
| 2004/0206405 | A1 | 10/2004 | Villeneuve et al. |
| 2005/0060107 | A1 | 3/2005 | Rodenberg, III et al. |
| 2005/0067049 | A1 | 3/2005 | Fima et al. |
| 2006/0009928 | A1 | 1/2006 | Addink et al. |
| 2006/0152344 | A1 * | 7/2006 | Mowery, Jr. ............. 340/310.11 |
| 2006/0195275 | A1 | 8/2006 | Latham et al. |
| 2006/0245467 | A1 | 11/2006 | Casella et al. |
| 2008/0079437 | A1 | 4/2008 | Berkcan et al. |
| 2008/0086394 | A1 | 4/2008 | O'Neil et al. |
| 2008/0224892 | A1 | 9/2008 | Bogolea et al. |
| 2008/0255782 | A1 | 10/2008 | Bilac et al. |
| 2009/0072985 | A1 | 3/2009 | Patel et al. |

FOREIGN PATENT DOCUMENTS

| | | |
|---|---|---|
| WO | WO 2009081407 | 7/2009 |

OTHER PUBLICATIONS

Ekahau Upgrades Site Survey to Refine Wi-Fi Network Planning and Administration, 2 pages. 2007.

Bahl, P. and Padmanabhan, V., Radar: An In-Building RF-Based User Location and Tracking System, In the Proceedings of IEEE Infocom. pp. 775-784. 2000.

Beckmann, C., Consolvo, S., and LaMarca, A., Some Assembly Required: Supporting End-User Sensor Installation in Domestic Ubiquitous Computing Environments, In the Proceedings of Ubicomp 2004, pp. 107-124. 2004.

Beigl, M., Zimmer T., Krohn, A., Decker, C., and Robinson P., Smart-Its—Communication and Sensing Technology for UbiComp Environments, Technical Report ISSN 1432-7864. Mar. 2002.

Castro, P., Chiu, P., Kremenek, T., and Muntz, R., A Probabilistic Room Location Service for Wireless Networked Environments, In the Proceedings of Ubicomp 2001. pp. 18-34. 2001.

Chen, J., Kam, A., Zhang, J., Liu, N., Shije, L., Bathroom Activity Monitoring Based on Sound, In the Proceedings of Pervasive 2005. pp. 47-61. 2005.

Chetty, M., Sung, J., Grinter, R., How Smart Homes Learn: The Evolution of the Networked Home and Household, In the Proceedings of Ubicomp 2007. pp. 127-144. 2007.

Ekahau Deploys a First Mobile Tracking Solution in Madrid Public Transport Complex, 2 pages. 2007.

Crossbow's New ZigBee-Ready, 802.15.4 Radio-Compliant MICAz Mote an Instant Hit, 4 pages. 2004.

Ananthaswamy, A., March of the Motes: An Unseen Silicon Army is Gathering Information on Earth and Its Inhabitants. It's not an Alien Reconnaissance Mission: Smart Dust is Finally Hitting the Streets, 7 pages. 2003.

Fogarty, J., Au, C., and Hudson, S., Sensing from the Basement: A Feasibility Study of Unobtrusive and Low-Cost Home Activity Recognition, in the Proceedings of ACM Symposium on User Interface Software and Technology (UIST 2006). 2006.

Study Finds Elder Care a Growing Emotional and Financial Burden for Baby Boomers New ADT Monitoring Service for Elderly Helps Ease the Stress of Long Distance Care Giving, 4 pages. 2005.

Hamerly, G. and Elkan, C., Learning the k in k-means, In the Proceedings of the Seventeenth Annual Conference Neural Information Processing Systems (NIPS). 2003.

Hazas, M., and Ward, A., A novel broadband ultrasonic location system, in the Proceedings of Ubicomp 2002.

Hazas, M., and Hopper, A., Broadband ultrasonic location systems for improved indoor positioning, In IEEE Transactions on Mobile Computing. 2006.

Hightower, J. and Borriello, G., A Survey and Taxonomy of Location Systems for Ubiquitous Computing, University of Washington Tech Report CSC-01-08-03, 29 pages. 2001.

Hirsch, T., Forlizzi, J., Hyder, E., Goetz, J., Kurtz, C., Stroback, J., The ELDer Project: Social and Emotional Factors in the Design of Eldercare Technologies, Conference on Universal Usability 2000, pp. 72-79. 2000.

HomePlug Powerline Alliance, web.archive.org/web/20060225110201/www.horneplug.org/en/index.asp, 1 pages. 2006.

Cook, B., Lanzisera, S., Pister K., SoC Issues for RF Smart Dust, Proceedings of the IEEE, vol. 94, No. 6, pp. 1177-1196. 2006.

Kjaergaard, M., A taxonomy for location fingerprinting, In the Proceedings of the Third International Symposium, on Location and Context Awareness (LoCA 2007) pp. 139-156. 2007.

Koile, K., Tollmar, K., Demirdjian, D., Shrobe, H., and Darrell, T., Activity Zones for Context-Aware Computing, in the Proceedings of UbiComp 2003. pp. 90-106. 2003.

Krumm, J., Cermak, G., and Horvitz, E., RightSPOT: A Novel Sense of Location for a Smart Personal Object. In the Proceedings of Ubicomp 2003. pp. 36-43. 2003.

Laasonen, K., Clustering and prediction of mobile user routes from cellular data, In the Proceedings of Principles and Practice of Knowledge Discovery in Database 2005. 2005.

LaMarca, A., Chawathe, Y., Consolvo, S., Hightower, J., Smith, I., Scott, J., Sohn, T., Howard, J., Hughes, J., Potter, F., Tabert, J., Powledge, P., Borriello, G., and Schilit, B., Place Lab: Device Positioning Using Radio Beacons in the Wild, In the Proceedings of Pervasive 2005. pp. 116-133. 2005.

Lamming, M. and Bohm, D., SPECs: Another Approach to Human Context and Activity Sensing Research, Using Tiny Peer-to-Peer Wireless Computers, In the Proceedings of Ubicom 2003.

MacQueen, J., Some Methods for Classification and Analysis of Multivariate Observations, In the Proceedings of the Fifth Berkeley Symposium on Mathematical Statistics and Probability, pp. 281-297. 1967.

Madhavapeddy, A. and Tse, T., Study of Bluetooth Propagation Using Accurate Indoor Location Mapping, In the Proceedings of Ubicom 2005, pp. 105-122. 2005.

Ekahau, Markets and Technical Considerations for Campus-wide Location Systems, 14 pages. 2006.

HomePlug Powerline Alliance, web.archive.org/web/20051223071109/www.homeplug.org/en/products/experience_, 2 pages. 2006.

O'Connell, T., Jensen, P., Dey, A., and Abowd, G., Location in the Aware Home, Position paper for Workshop on Location Modeling for Ubiquitous Computing at Ubicomp 2001.

Orr, R. and Abowd, G., The Smart Floor: A Mechanism for Natural User Identification and Tracking, In the Proceedings of the Extended Abstracts of CI-II 2000, pp. 275-276. 2000.

Otsason, V., Varshaysky, A., LaMarca A., and de Lara, E., Accurate GSM Indoor Localization, In the Proceedings of UbiComp 2005. pp. 141-158.

Patel, S., Supporting Location and Proximity-Based Studies in Natural Settings, Adjunct Proceedings of Pervasive 2007.

Patel, S., Reynolds, M., Abowd, G., Detecting Human Movement by Differential Air Pressure Sensing in HVAC System Ductwork: An Exploration in Infrastructure Mediated Sensing, In the Proceedings of Pervasive 2008. pp. 1-18.

Patel, S., Robertson, T., Kientz, J., Reynolds, M., Abowd, G., At the Flick of a Switch: Detecting and Classifying Unique Electrical Events on the Residential Power Line, In the Proceedings of Ubicomp 2007, pp. 271-288.

Patel, S., Truong, K., Abowd, G., PowerLine Positioning: A Practical Sub-Room-Level Indoor Location System for Domestic Use, In the Proceedings Ubicomp 2006, pp. 441-458.

Priyantha, N., Chakraborty, A., and Balakrishnan, H., The Cricket Location-Support System, In the Proceedings of Mobicom 2000, pp. 32-43.

Rekimoto, J., and Ayatsuka, Y., Cybercode: Designing Augmented Reality Environments with Visual Tags, In the Proceedings of Designing Augmented Reality Environments, 10 pages. 2000.

Rekimoto, J., and Katashi, N., The World Through the Computer: Computer Augmented Inter-action With Real World Environments, In the Proceedings of UIST 1995.

Ubisense Hardware Datasheet, 1 page. 2006.

Cricket v2 User Manual, 57 page. 2005.

Tapia, E., Intille, S., Lopez, L., and Larson, K., The Design of a Portable Kit of Wireless Sensors for Naturalistic Data Collection, In Proceedings of Pervasive 2006, pp. 117-134.

Tapia, E., Intille, S., and Larson, K., Activity Recognition in the Home Setting Using Simple and Ubiquitous Sensors, In the Proceedings of Pervasive 2004, pp. 158-175. 2006.

Darby, S., The Effectiveness of Feedback on Energy Consumption, Environmental Change Institute, University of Oxford, 21 pages. 2006.

Horst, G., Whirlpool Corporation: Woodridge Energy Study and Monitoring Pilot. pp. 1-99. 2006.

Want, R., Hopper, A., Falcao, V., and Gibbons, J., The Active Badge Location System, ACM Transactions on Information Systems, vol. 10, pp. 91-102. 1992.

Mountain, D., SUMMARY The Impact of Real-Time Feedback on Residential Electricity Consumption: The Hydro One Pilot, pp. 2471-2480. 2010.

Patel, S., Gupta S., and Reynolds M., End-User-Deployable Whole House Contact-Less Power Consumption Sensing, UbiComp 2009, 4 pages. 2009.

Ward, A., Jones, A., and Hopper, A., A New Location Technique for the Active Office. 1997.

Weka 3: Data Mining Software in Java. http://www.cs.waikato.ac.nz/ml/weka/. Mar. 2006.

Wellbrook communications ala-1530+ antenna, web.archive.org/web/20060521015053/http:www.wellbrook.uk.com/products.html. 2006.

Wren, C. and Munguia-Tapia, E., Toward Scalable Activity Recognition for Sensor Networks. In the Proceedings of LoCA 2006, pp. 168-185. 2006.

Yang, Z. and Bobick, A., Visual Integration from Multiple Cameras, In the Proceedings of WACV/MOTION 2005, pp. 488-493.

Arvola, A., Uutela, A., Anttila, U., Billing Feedback as a Means to Encourage Household Electricity Conservation: A Field Experiment in Helsinki, Proceedings of the 1993 Summer Study of the European Council for Energy Efficient Economy. pp. 11-21. 2003.

Brandon, G., Lewis A., Reducing Household Energy Consumption: A Qualitative and Quantitative Field Study, Journal of Environmental Psychology, pp. 75-85. 1999.

Darby, S., Making it Obvious: Designing Feedback into Energy Consumption, Proceedings of the Second International Conference on Energy Efficiency in Household Appliances and Lighting, 11 pages. 2000.

Fischer, C., Feedback on Household Electricity Consumption: A Tool for Saving Energy? Energy Efficiency, pp. 79-104. 2008.

Froehlich, J., Sensing and Feedback of Everyday Activities to Promote Environmentally Sustainable Behaviors, Thesis Proposal, Computer Science and Engineering, University of Washington, 35 pages. 2009.

Froehlich, J., Everitt, K., Fogarty, J., Patel, S., Landay, J., Sensing Opportunities for Personalized Feedback Technology to Reduce Consumption. UW CSE Technical Report: CSE Sep. 13, 2001, 7 pages. 2009.

Kjaergaard, M. A Taxonomy for Radio Location Fingerprinting. Department of Computer Science, University of Aarhus, Denmark. pp. 139-156. 2007.

Mountain, D., Price Influences Demand, DeGroote School of Business, McMaster University, 16 pages. 2008.

Parker, D., Hoak, D., Cummings, J., Contract Report: Pilot Evaluation of Energy Savings from Residential Energy Demand Feedback Devices, Florida Solar Energy Center, A Research Institute of the University of Central Florida, 32 pages. 2008.

Ueno, T., Inada, R., Saeki, O., Tsuji, K., Effectiveness of Displaying Energy Consumption Data in Residential Houses, Analysis on How the Residents Respond, ECEEE 2005 Summer Study—What Works and Who Delivers? pp. 1289-1299. 2005.

HomePlug Powerline Alliance, web.archive.org/web/20060225110208/www.homeplug.org/en/products/index.asp, 1 page. 2006.

HomePlug Powerline Alliance, web.archive.org/web/20060303084808/www.homeplugsog/en/products/experience_, 2 pages. 2006.

* cited by examiner

6:00 AM - 9:00 AM on Sat.   Ave. = 349.5   Std. Dev. = 9.7

Time

7:00 AM - 10:00 AM on Sat.   Ave. = 349.5   Std. Dev. = 4.2

Time

2:00 PM - 5:00 PM on Fri.  Ave. = 350.5   Std. Dev. = 3.1

6:00 AM - 9:00 AM on Sun.  Ave. = 349.5   Std. Dev. = 17.3

SUB-ROOM-LEVEL INDOOR LOCATION SYSTEM USING POWER LINE POSITIONING

This application claims the benefit of U.S. Provisional Application No. 60/817,225, filed Jun. 28, 2006.

BACKGROUND

The present invention relates generally to indoor location systems, and more particularly, to indoor location systems that employ radio signals transduced via power lines.

Recent advances in indoor location systems leverage existing wireless communication infrastructure (e.g., 802.11 and GSM) to provide a value-added location service. The major advantage of these approaches is that a user does not have to purchase any specialized equipment and can still benefit from location-aware computing. Leveraging public infrastructure has many advantages, but one major drawback is that users have very little control of the infrastructure itself. Service providers adjust the operational parameters of WiFi access points and cellular towers with little or no warning. These changes require recalibration of the location system and may result in inaccurate location data until the changes are discovered. An alternative is to introduce new infrastructure in the home by distributing many low-cost, short-range beacons. The time required for installation and the possible impact to home aesthetics, however, may limit adoption.

Indoor positioning has been very active in the ubiquitous computing research community in the subsequent half decade. Several characteristics distinguish different solutions, such as the underlying signaling technology (e.g., IR, RF, load sensing, computer vision or audition), line-of-sight requirements, accuracy, and cost of scaling the solution over space and over number of items. Although we do not intend to provide a complete survey of this topic, we highlight those projects with characteristics most relevant to the motivation for power line positioning, namely the requirements for additional infrastructure and algorithmic approach.

The earliest indoor positioning solutions introduced new infrastructure to support localization. See, for example, "Active Bat," The BAT Ultrasonic Location System, 2006; O'Connell, T., Jensen, P., Dey, A. K., and Abowd, G. D., "Location in the Aware Home," Position paper for Workshop on Location Modeling for Ubiquitous Computing at Ubicomp 2001 Sep. 30, Atlanta, Ga., 2001; Priyantha, N. B., Chakraborty, A., and Balakrishnan, H., "The Cricket Location-Support System," Proceedings of *The International Conference on Mobile Computing and Networking (Mobicom* 2000), Boston, Mass., August, 2000; and Want, R., Hopper, A., Falcao, V., and Gibbons, J., "The active badge location system," "*ACM Transactions on Information Systems*," Volume 10, pp. 91-102, January, 1992.

Despite some success, as indicated by some commercialized products, the cost and effort of installation are a major drawback to wide-scale deployment, particularly in domestic settings. Thus, many new projects in location-based systems research reuse existing infrastructure to ease the burden of deployment and lower the cost. The earliest demonstrations leveraged 802.11 access points (see, for example, Bahl, P. and Padmanabhan, "V. RADAR: An In-Building RF-Based User Location and Tracking System," Proceedings of *IEEE Infocom*, Los Alamitos, pp. 775-784, 2000; Castro, P., Chiu, et al., "A Probabilistic Room Location Service for Wireless Networked Environments," Proceedings of *Ubicomp* 2001, pp. 18-34, 2001; and LaMarca, A., et al., "Place Lab: Device Positioning Using Radio Beacons in the Wild," Proceedings of *Pervasive* 2005, Munich, Germany, pp. 116-133, 2005.

More recent examples explore Bluetooth (see, for example, Madhavapeddy, A. and Tse, T., "Study of Bluetooth Propagation Using Accurate Indoor Location Mapping," *The Seventh International Conference on Ubiquitous Computing (UbiComp* 2005), Tokyo, Japan, pp 105-122, September 2005, and wireless telephony infrastructure, such as GSM (see, for example, V. Otsason et al., "Accurate GSM Indoor Localization," Proceedings of *The Seventh International Conference on Ubiquitous Computing (UbiComp* 2005), Tokyo, Japan, September, 2005), or FM transmission towers (see, for example, Krumm, J., Cermak, G., and Horvitz, E., "RightSPOT: A Novel Sense of Location for a Smart Personal Object," Proceedings of *Ubicomp* 2003, Seattle, Wash., pp. 36-43, 2003. Concerns about system resolution eliminate the FM solution for domestic use.

Another concern we highlighted in the introduction is that individuals and households may not be able to control the characteristics of this infrastructure, resulting in the need to recalibrate if parameters change. The desire to control the infrastructure and to scale inexpensively to track a large number of objects inspired the search for a solution like the power line system presented here.

Traditional wireless signal triangulation, such as 802.11 access point triangulation, uses Received Signal Strength Indicator (RSSI) information to estimate distance and determine a location based on geometric calculations employing the RSSI data. Other techniques include the use of Time of Arrival, as in the case of ultrasound, or Angle of Arrival, such as with Ultra-wideband positioning (see the Ubisense website, for example). Ultrasonic solutions, such as Cricket (see Priyantha, N. B., et al., "The Cricket Location-Support System," Proceedings of *The International Conference on Mobile Computing and Networking (Mobicom* 2000), Boston, Mass., August, 2000, and Active Bat, the BAT Ultrasonic Location System, provide precise centimeter resolution, but require line-of-sight operation indoors. Therefore, they require extensive sensor installations for full coverage. Some radio frequency technologies, such as 802.11 triangulation, employ overdetermination of transmitting sites (e.g., wireless access points) to avoid issues of occlusion induced by multipath propagation caused by reflections in the environment.

Fingerprinting of the received signals can help overcome the multipath problem. Fingerprinting improves on other means of estimation by taking into account the effects that buildings, solid objects, or people may have on a wireless or RF signal, such as reflection and attenuation. Fingerprinting works by recording the characteristics of wireless signals at a given position and later inferring that position when the same signature is seen again. A survey of signals over a surveyed space allow for the creation of a map that can be used to relate a signal fingerprint to a location.

Power lines are already in place in most buildings and the power network reaches more homes than either cable systems or telephone lines. Thus, for many years, people have been using power lines in buildings (especially homes) to deliver more than just electricity. Several home automation technologies leverage the power line for communications and control. The most popular example is the X10 control protocol for home automation, a standard that is more than 30 years old and is a very popular, low-cost alternative for homeowners. Over the past decade, there have been a number of efforts to produce power line communications capabilities, driven by industrial consortia such as the HomePlug Powerline Alliance, and efforts such as Broadband over Powerline (BPL). Because electricity used for power is sent over power lines at a lower frequency (e.g., 60 Hz) than Internet data signals modulated on high frequency carriers, power and data can coexist on the same power line without interference.

It would be desirable to have an indoor location system that takes advantage of existing infrastructure, such as electrical power lines, and the like, and which does not require additional infrastructure.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Disclosed is an exemplary indoor location system that uses an electrical power line as a signaling infrastructure to simultaneously track multiple objects, and which may be used in buildings or structures, such as homes and business buildings, and the like. An affordable, whole-building indoor localization system is described below, that works in a vast majority of households, scales cost-effectively to support tracking of multiple objects simultaneously and does not require the installation of additional new infrastructure. The solution requires installation of at least two transmission modules that are connected to or plugged-into a building's electrical system at different locations within the building. These modules inject a low-frequency, attenuated signal throughout the electrical system of the building. Simple receivers, or positioning tags, listen for these signals and wirelessly transmit their positioning readings back to a base station. The base station is used to process the transmitted signals to produce a location map containing spatial locations of the positioning tags. The base station may use a two-phase localization algorithm based on signal fingerprinting to provide position location. Alternatively, in other embodiments, the processing sometimes performed in the base station may be incorporated into the positioning tag.

This solution, referred to as power line positioning (PLP) is capable of providing sub-room-level positioning for multiple regions of a building and has the ability to track multiple tags simultaneously. Power line positioning has a localization accuracy of 87-95% for classifying regions at 3-4 meters resolution. An embodiment of this system has been reduced to practice, installed and tested in several buildings, and its performance has been compared against existing 802.11 and GSM solutions.

Figure 1:
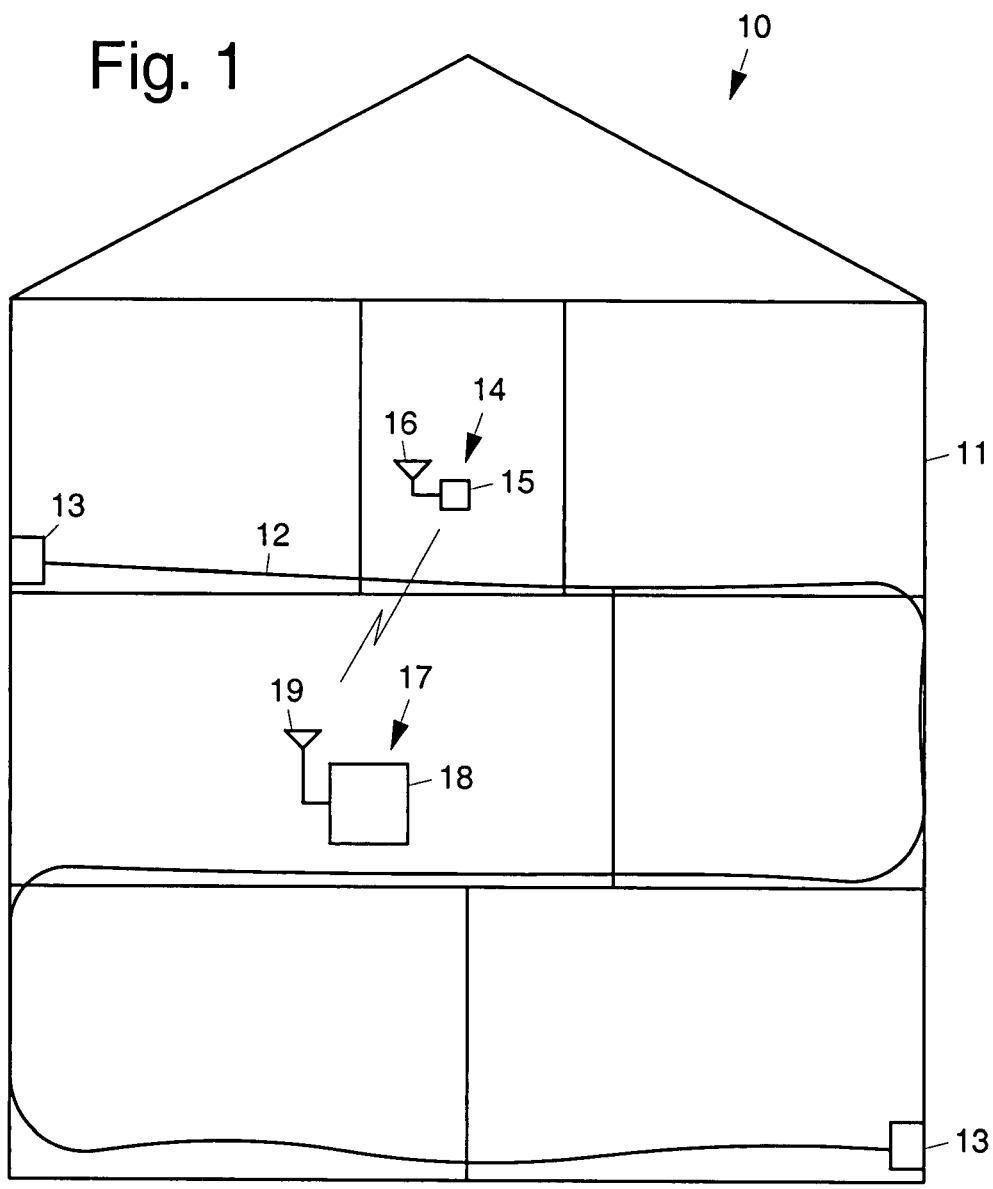
FIG. 1 illustrates an exemplary indoor location system installed in an exemplary building, in this case a residence.

Referring to the drawing figures, FIG. 1 illustrates an exemplary indoor location system 10, comprising a power line positioning system 10. The indoor location system 10 uses an electrical power line 12 (or wiring of an electrical system 12) as a signaling infrastructure to simultaneously track multiple objects (positioning tags 14) located in a home 11, for example. The indoor location system 10 may be used in any structures 11, including homes 11 and businesses 11, for example.

FIG. 1 shows placement of at least two signal-generating modules 13 at extreme ends of a house 11. It is to be understood, however, that many such signal-generating modules 13 may be employed throughout the home 11. The number of signal-generating modules 13 generally determines the resolution of the system 10. Signal-generating modules 13 may comprise off-the-shelf, plug-in tone generator modules. The positioning tag 14, which comprises a receiver 15 and antenna 16 is wirelessly coupled to a computer 17 comprising a receiver 18 and an antenna 19, that is used for processing signals to determine position location of the tags 14. In this embodiment, the computer 17 performs the functions of the base station processing, although in other embodiments the base station processing is performed by a processor collocated with the positioning tag.

Theory of Operation

The power line positioning system 10 is loosely related to a wire-finding technique employed by many electricians and utility workers to locate or trace hidden wires behind a wall or underground. In the wire-finding technique an electrician connects an exposed end of a wire to a tone generator, whose signal can range from 10-500 kHz, and locates the hidden wire using a handheld, inductive tone detector. Some detectors use LEDs to indicate the tone strength and others play an audible sound. In either case, the electrician scans the area for the loudest tone, indicating the approximate location of the wire. Following the presence of the tone reveals the path of the wire.

The following properties of the wire-finding technique are leveraged and extended to produce a viable solution for the location system 10. (1) It is easy and inexpensive to propagate a signal or tone throughout the entire electrical system 12 in the home 11 without any electrical interference. (2) It is possible to set the power of the signal so that it attenuates as it reaches the periphery of the home 11, and the electrical wiring appears in varying densities throughout the home 11, creating a time-independent spatial variation of the signal throughout the home 11. (3) The tone detectors or receivers (position tags 14) are fairly simple, inexpensive to construct, and have low power requirements. It should be appreciated that it is anticipated that a system may consist of more than one position tag 14.

In the power line positioning system 10, and as is illustrated in FIG. 1, the wire-finding technique is extended to include at least two plug-in signal generator modules 13. The modules 13 are connected directly into electrical outlets of the electrical system 12, and their respective signals emanate from those outlets to the rest of the home 11. One of the at least two modules 13 is installed in an outlet close to a main electrical panel or circuit breaker, for example, and the other module 13 is plugged into an outlet which is placed along the power line infrastructure furthest from the first module 13. In most cases, physical distance is a good estimate of electrical distance.

In the case of a two-story house 11 with a basement, for example, one module 13 may be placed at a west end of the house 11 in the basement (where the main panel is located), for example, and the other in the east end on the second floor, for example. Each module 13 emits a different frequency signal throughout the power line of the electrical system 12. As part of the installation, the signal strength is adjusted so that significant attenuation occurs and the signal still reaches the opposite end of the home 11. Both modules 13 continually emit their respective signals over the power line and portable tag(s) 14 equipped with specially-tuned tone detectors (receivers 15) sense these signals in the home 11 and relay them wirelessly to the base station 17. Depending on the location of the portable tag(s) 14, the detected signal levels provide a distinctive signature, or fingerprint, resulting from the density of electrical wiring present at the given location. The base station 17 (e.g., wireless receiver 18 and antenna 18 connected to a PC) analyzes the fingerprint and maps the signal signature to its associated location based on a site survey. More than one tag 14 may be present in the building and each tag 14 may independently receive power line transduced signals for the purpose of computing the position of each tag 14.

Phase difference between signals is another signal feature that may be leveraged for localization. A pair or group of signals generated in relative synchrony at harmonically or sub-harmonically related frequencies will exhibit a phase difference due to radio propagation in the building's wiring as well as due to differences in radio propagation delay through the interior of the building. This phase difference can be employed as another feature in the fingerprinting localization algorithm presented herein.

When the modules 13 are active, the tone detector or positioning tag(s) 14 picks up the presence and amplitude of the power line transduced signals throughout the home 11. Because electrical wiring typically branches inside the walls, ceiling, and floors, signal will be present throughout much of the main living areas of the home 11. Three factors contribute to the amplitude of the signal received by the tag(s) 14 at any given location: (1) the distance between the tag(s) 14 and electrical wiring; (2) the density of electrical wiring in an area; and (3) the distance from the transmitting modules 13 to the tag(s) 14.

Figure 2A:
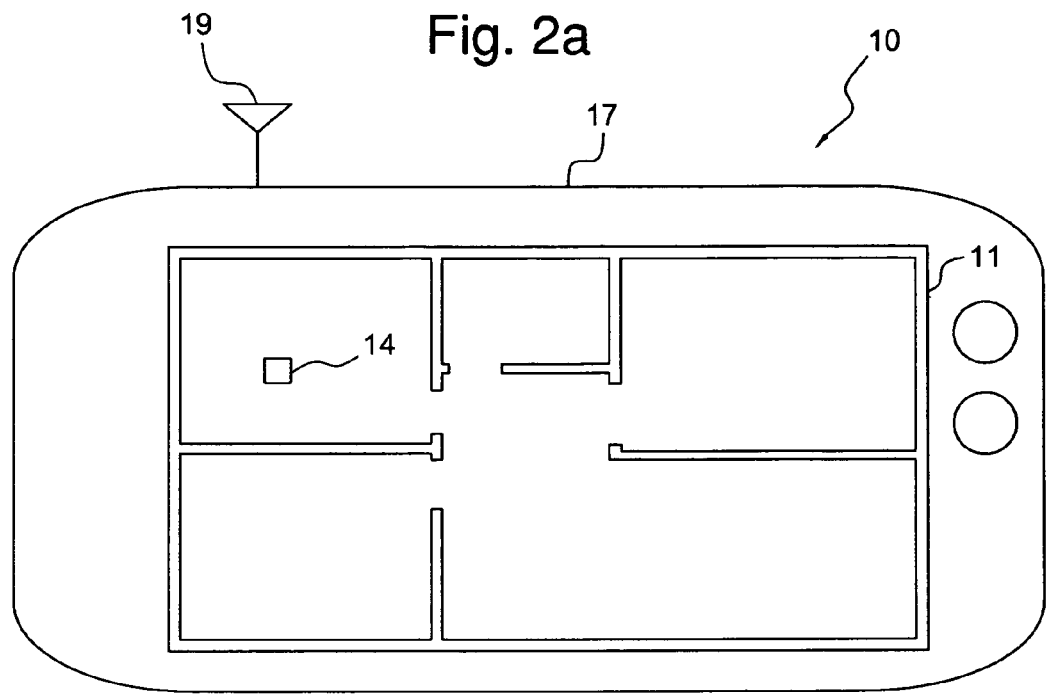
FIG. 2a illustrates an exemplary user interface employed to map and localize the position of a connected receiver.
Figure 2B:
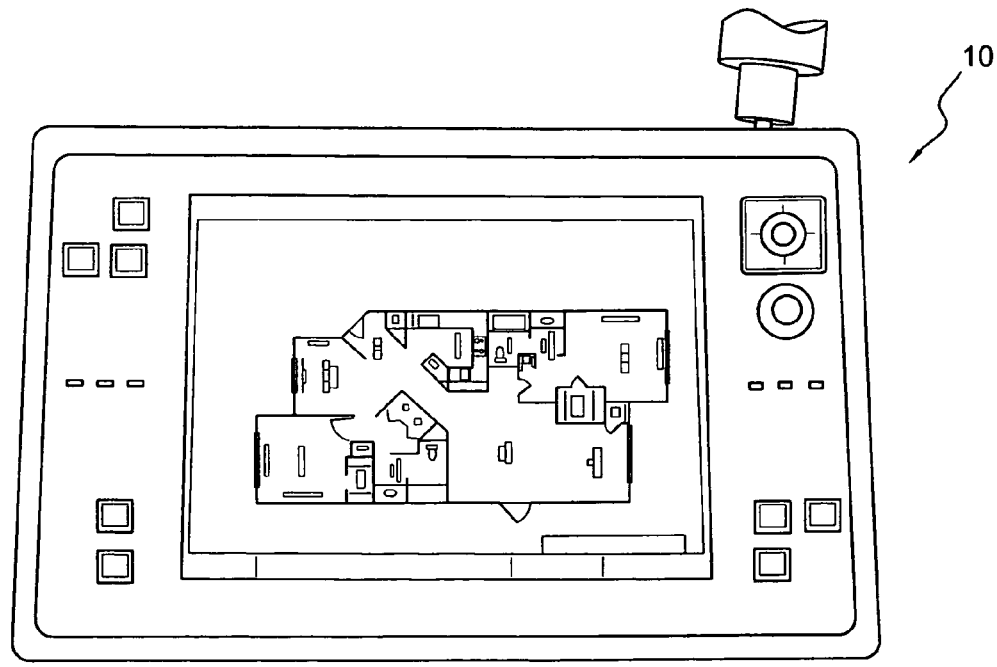
FIG. 2b illustrates a photograph of a reduced-to-practice user interface.

FIG. 2a illustrates an exemplary user interface implemented in the computer 17 that may be used to map and localize the position of a connected receiver. FIG. 2b illustrates a photograph of a reduced-to-practice user interface. The computer 17 has a display screen on which a layout of the home 11 is presented. The spatial position of the positioning tag(s) 14 is determined using software implemented on the computer 17.

Figure 3A:
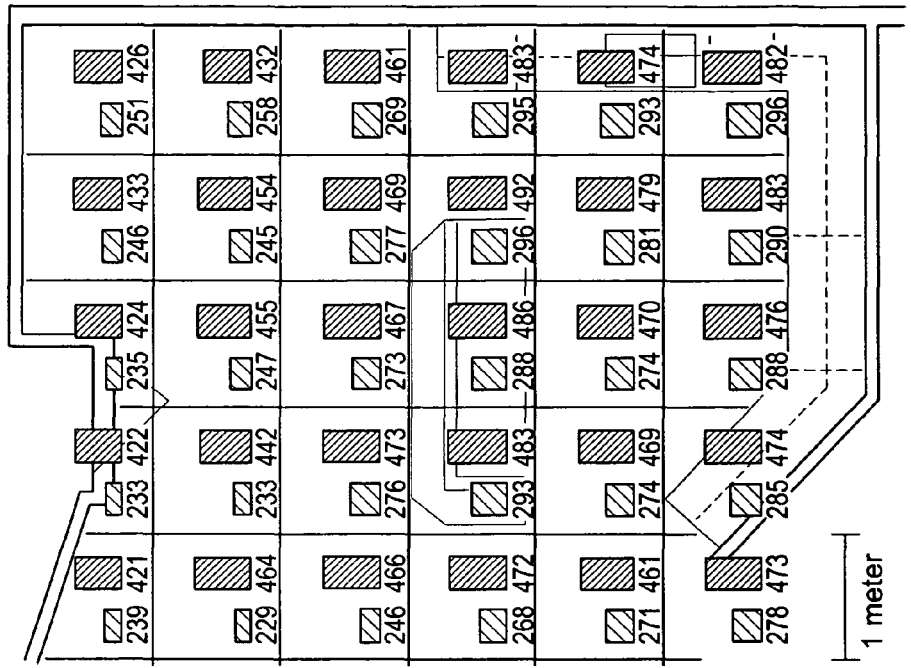
FIGS. 3a and 3b illustrate exemplary signal maps of a bedroom and kitchen of a home.
Figure 3B:
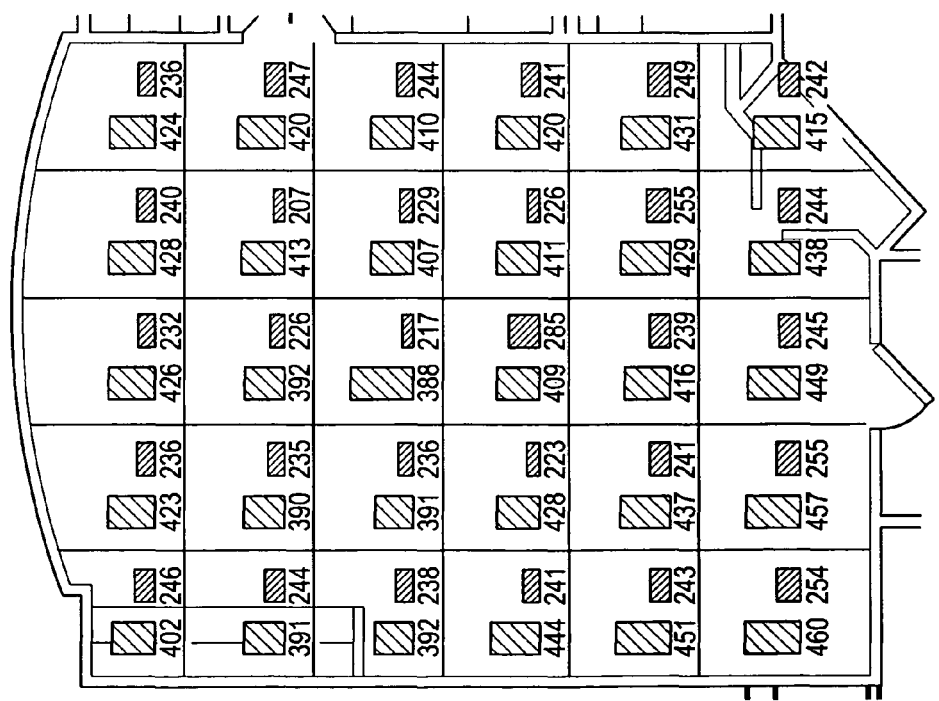

FIG. 3a shows an exemplary signal map of a bedroom of the home 11 and FIG. 3b shows an exemplary signal map of a kitchen of the home 11. In each cell, the left-hand number corresponds to signal strength from one transmitting module or device 13 and the right-hand number corresponds to the signal strength of the other transmitting module or device 13. In the bedroom, the strength of both signals increases near the walls where there is the greatest concentration of electrical wiring and outlets. The strength of signal A (left value in each cell shown in FIGS. 3a and 3b) is weaker than the strength of signal B (right value in each cell) in the kitchen, and the opposite is true for the bedroom. Because the two rooms are on different floors and at opposing ends of the house 11, each room is closer to a different module 13.

Most residential homes and apartments in North America and many parts of Asia have a single phase or a split single phase electrical system, which enables any signal generated on a given outlet to reach the entire electrical system. Larger buildings and some homes in Europe have two and three phase electrical systems, in which the electrical system may split into separate legs for lower voltage applications. For multi-phase electrical systems, the signal can be coupled between the phases using a capacitor. In a home, this would typically be plugged-in in a 240V outlet, such as that used for clothes dryer. The present description focuses on common residential single or split single phase electrical systems operating at 60 Hz. However, the system may be readily adapted for use in other electrical systems.

Power Line Positioning Localization Algorithm

The power line positioning system 10 relies on a fingerprinting technique for position localization. This technique requires generation of a signal topology map via a site survey which may be performed either manually or automatically, for example by a robotic device that automatically visits multiple locations in the building to perform the site survey. The granularity of the survey influences the final accuracy of the positioning system 10. For power line positioning in the home 11, the site survey is a one-time task provided the transmitting modules 13 emit a consistent power level, stay fixed in place, and the electrical characteristics of the home 11 remain substantially the same.

Effective application of fingerprinting requires the signals to have low temporal variations, but high spatial variation and relatively low correlation from one location to another. As discussed above, the propagation of signals transmitted via the power line 12 exhibits both of these properties, because the detected signals vary little unless the modules 13 are moved or the electrical system 12 has been significantly remodeled. The use of two different signals and the variability in the electrical wire density throughout the home 11 provides this spatial variation.

An exemplary localization algorithm that may be used in the power line positioning system 10 proceeds in two steps. The first step predicts the location of a positioning tag 14 in terms of which room it is located within, and the second predicts the location of a positioning tag 14 in terms of sub-regions within that room. Both may use k-nearest neighbor (KNN) classification.

k-Nearest Neighbor (KNN) Classification

The room and sub-room localizers (positioning tag(s) 14) may use k-nearest neighbor (KNN) classification to determine the receiver's room location. KNN is discussed by T. Mitchell, in *Machine Learning*, McGraw Hill, ISBN 0070428077, 1997. KNN is a memory-based model defined by a set of objects known as learned points, or samples, for which the outcomes are known. Each sample consists of a data case having a set of independent values labeled by a set of dependent outcomes. Given a new case of dependent values (the query point or unknown value), we estimate the outcome based on the KNN instances. KNN achieves this by finding k examples that are closest in distance to the query point. For KNN classification problems, as discussed herein, a majority vote determines the query point's class. For this task, given an unlabeled sample, the k closest labeled room samples in the surveyed data are found and assigned to the room that appears most frequently within the k-subset. For our distance measure d, the Euclidean distance, $$d(x, y) = \sqrt{\left(\sum_{i=1}^{2} (x_i - y_i)^2\right)},$$

in which tuples x=<Signal $A_{x1}$, Signal $B_{x2}$> and y=<Signal $A_{y1}$, Signal $B_{y2}$>. The tuple x refers to a labeled signal point and triple y refers to the unlabeled query point sensed by the positioning tag 14. For more modules 13, the dimension is increases to match the number of modules 13.

Room and Sub-Room Localization

One difference between the room and sub-room classifiers are the labels assigned to the data points and the value for k used in the localization. For room level classification, room labels are assigned to samples from the site survey. In the sub-room classification, the same samples are subdivided and sub-room labels are assigned to them. For each home 11, there is an optimal and initially unknown value of k for the room level localizer. Within the same home 11 there is an optimal value for the sub-room level localizer for each room. Thus, for localization, the KNN classification is first executed using the room labeled samples and its optimal k value. After determining the room, KNN is executed on the sub-room labeled samples from that room and its optimal k value to determine the sub-room.

Training the System and Determining k in KNN

The choice of k is essential in building the KNN model and strongly influences the quality of predictions, for both room-level and sub-room-level localization. For any given problem, a small value of k will lead to a large variance in predictions. Alternatively, setting k to a large value may lead to a skewed model. Thus, k should be set to a value large enough to minimize the probability of misclassification and small enough (with respect to the number of cases in the example sample) so that the k nearest points are close enough to the query point. Thus, an optimal value for k that achieves the tight balance between the bias and the variance of the model. KNN can provide an estimate of k using a cross-validation technique discussed in the Machine Learning reference previously cited.

Splitting the localization into two steps can help control the cluster sizes. In classifying the room, a larger value of k is used so that a larger region is considered when trying to find where the unknown signal potentially maps. To localize within a room, smaller values of k are used so that finer clusters are match and because of the smaller data sets within a room than the whole home 11.

The training interface allows end users to build a signal map of the home 11 (see FIGS. 2a and 2b). The user loads a pre-made or hand-drawn floor plan of the home 11 into the application. The interface displays the floor plan, and one physically travels to different locations in the home 11 and chooses the approximate location on the floor plan. When a location is selected, the application stores the fingerprint for that location, which is a one-second average of the amplitude of the at least two detected signals from the at least two transmitting modules. The same process continues throughout the home 11. Surveying at a granularity of approximately 2-3 meters in each room produces more than sufficient accuracy for the test cases presented below. The interface allows the user to assign meaningful labels to different room and sub-room areas, such as "kitchen" and "center of master bedroom."

For optimal performance in sub-room level localization, each room may be segmented into five regions: the center of the room and areas near the four walls of the room. The user is free to select the location granularity (assuming sufficient training sets) of their choice for important regions. However, the desired segmentation may not reflect the actual segmentation the underlying set of signals can provide. For example, a user may want to segment the middle part of a bedroom into four regions, but there might not be enough signal disparity among those regions for the KNN classifier to work well. Some assistance may be provided in overcoming those limitations by automatically clustering the room into potential sub-regions that are likely to be accurately classified based on the room's signal map. A k-means clustering algorithm may be employed to provide graphical suggestions on where to segment for a desired number of sub-regions.

After construction of the signal map and all data has been labeled, the algorithm cross-validates model data to find suitable k values for the room and sub-room classifiers. Cross-validation involves the division of the data samples into a number of v folds (randomly drawn, disjoint sub-samples or segments). For a fixed value of k, the KNN model is applied on each fold and the average error is evaluated. The algorithm repeats these steps for various k values. The algorithm selects the value for k achieving the lowest error (or the highest classification accuracy) as the optimal value for k. This value for k depends on the home 11 and the number of sample points. Generally, optimal k values are seen near 10 for the room localizer and k values near 3-5 for the sub-room localizer.

Module Design

For rapid development and investigation, commercially available tone generators (modules 13) and tone detectors (tags 14) used by electricians were modified for use as part of the tags 14. In particular, a Textron Tempo 508S tone generator module and a Pasar Amprobe 2000 were used in one embodiment. These modules 13 produce a 447 kHz and 33 kHz tone, respectively, on an energized 120 VAC power line 12 without causing any interference to household appliances. In addition, the modules 13 are powerful enough to transmit a tone up to 500 meters over the electrical wire 12 (both hot and ground). The modules 13 are tuned to emit at a lower signal to control propagation through the electrical system 12. For one prototype that has been reduced to practice as part of a power line positioning system 10 discussed herein, the signal strength was manually adjusted depending on the size of the home 11. Samples were collected with the tag 14 near the module 13 and samples near the opposite side of the home 11 where the second module is located. The signal strength was tuned so that a large signal difference between the two locations was produced without turning it down so much that the signal did not reach the far end. In most cases, approximately a 2.5 dB loss was produced from end to end.

Although the steps described above were manually performed, it is anticipated to build the modules 13 to self-calibrate during the installation and surveying steps. It is also anticipated to perform a manual or robotic check step wherein the calibration is confirmed over time at specific location(s).

Tag Design

A Textron Tempo 508R passive wideband tone detector was modified to act as a prototype tag 14 that would send sensed signals to a portable computer 17 for analysis and position location determination. The tone detector has a built in frequency divider that maps a range of high frequency tones to audible sounds while still preserving the amplitude of the original signal. The tone detector's internal frequency divider translated a 447 kHz signal to about 1000 Hz and 33 kHz signal to about 80 Hz. The tone detector was altered to interface with the audio line-in jack of a portable computer to capture the signals.

A rather large prototype tag 14 was used that was easy to build. There are a variety of ways to construct a small and inexpensive version of this tag 14. One way is to feed the radio transducer or antenna 16 through a series of operational-amplifiers and into a DsPIC microcontroller. A low-power radio transmitter, such as those manufactured by Ming or Linx, or a WiFi (IEEE 802.11), Bluetooth radio, Zigbee radio, or any other wireless communication device may be used to transmit the readings back to the base station computer 18. Alternatively the need for a microcontroller may be bypassed by using multiple tone decoder ICs, similar to the NE567 IC, which supports signal power output. Powered by a small lithium cell, the tag 14 may easily be the size of a small key fob and run for a significant period of time using a motion switch to enable the circuitry when the positioning tag 14 is moved.

Software

Figure 4:
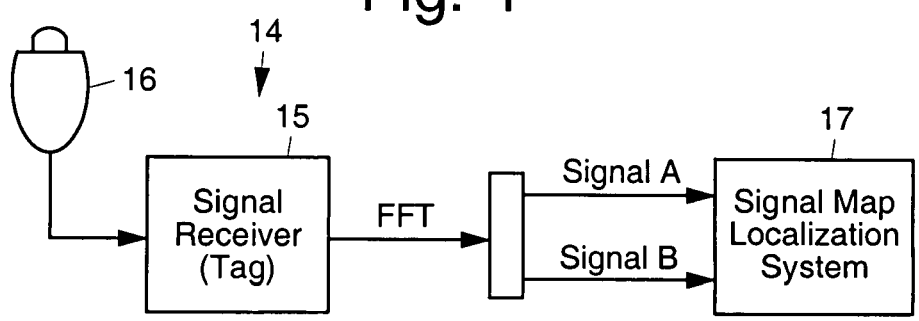
FIG. 4 illustrates an exemplary tagging implementation that may be used in the indoor location system.

In the experimental set-up, an application was written in C++ using a Microsoft Windows Win32 application programming interface (API) to sample the signal from the sound card's line-in jack where the prototype receiver tag is connected. The application acquires 16-bit samples from the receiver of the positioning tag 14 at a rate of up to 44 kHz and performs a Fast Fourier Transform (FFT) on the incoming signal to separate component frequencies for analysis. The application performs this analysis in very close to real-time and makes the raw signal strengths for the two frequencies of interest (447 kHz and 33 kHz) available through a TCP connection for other parts of the power line positioning system 10 to access (see FIG. 4). FIG. 4 illustrates an exemplary tagging implementation that may be used in the indoor location system 10.

The experimental prototype used for empirical validation consisted of a Sony Vaio-U handheld computer with all software applications (signal receiver, learner, and the user interfaces) loaded and the receiver hardware connected (see FIGS. 1 and 4). FIG. 4 illustrates an exemplary user interface used for mapping and localizing the position of the tag 14. Using this small but powerful device provides an easy way to survey homes 11.

Performance Evaluation

The performance of the power line positioning system 10 was evaluated in 8 different homes 11 of varying styles, age, sizes, and locations, all in the same metropolitan city. Both older homes 11 with and without remodeled and updated electrical systems were chosen (see Table 1 for specifications of the homes). In addition to evaluating the system 10, infrastructure tests of WiFi and GSM availability was simultaneously conducted to provide some comparison with other indoor localization results. The infrastructure tests only involved logging the availability of wireless 802.11 access points and multiple GSM towers in the home. A WiFi spotter application running on the Sony Vaio-U computer logged the wireless access points, and an application written on the Audiovox SMT-5600 GSM mobile phone logged available cellular telephone base stations.

In each home 11 that was analyzed, the power line positioning system 10 was installed, the two transmitting devices or modules 13 were calibrated and a signal map was created by surveying the home 11. When creating the signal map, multiple signal readings were taken every 2-3 meters throughout the home 11 to ensure enough training and test data was gathered for cross-validation. After creating the signal map, the interface on the handheld computer 17 was used to assign the appropriate room and sub-room labels to the data.

The classification accuracy of the room and sub-room predictors is presented below. The sub-room accuracy was calculated independent of the room-level predictor. Thirty-four (34) meter regions were used for the sub-room-level tests. To obtain the room-level accuracy, a 10-fold cross-validation on the room localizer was conducted using the collected data samples. This test was repeated for various k values to find the best accuracy measure. To determine the sub-room level accuracy, the data samples for each room were taken and a 10-fold cross-validation was performed using the sub-room localizer, again for different values of k. Similar to the room-level tests, the k value that provided the highest accuracy for predicting regions in a room were searched for. After testing each room, we average all the sub-room localization accuracies to produce an overall accuracy value.

Table 1 shows details of the homes where the power line positioning system 10 was deployed and evaluated.

TABLE 1

| Home | Year Built | Electrical Remodel Year | Floors/ Total Size (Sq Ft)/ (Sq M) | Style | Bedrooms/ Bathrooms/ Total Rms. | Population Density |
|---|---|---|---|---|---|---|
| 1 | 2003 | 2003 | 3/4000/371 | 1 Family House | 4/4/13 | Suburb |
| 2 | 2001 | 2001 | 3/5000/464 | 1 Family House | 5/5/17 | Suburb |
| 3 | 1992 | 1992 | 1/1300/120 | Apartment | 2/2/6 | Downtown |
| 4 | 2002 | 2002 | 3/2600/241 | 1 Family House | 3/3/12 | Suburb |
| 5 | 1967 | 2001 | 2/2600/241 | 1 Family House | 3/3/11 | Suburb |
| 6 | 1950 | 1970 | 1/1000/93 | 1 Family House | 2/2/5 | Suburb |
| 7 | 1926 | 1990 | 1/800/74 | 1 Bedroom Loft | 1/1/5 | Downtown |
| 8 | 1935 | 1991 | 1/1100/102 | 1 Family House | 2/1/7 | Suburb |

Power Line Positioning Accuracy

Between Homes Comparison

In Table 2, the results of room-level and sub-room level accuracies of the power line positioning system 10 are reported for various homes 11. Room accuracy ranged between 78-100% and sub-room accuracy ranged between 87-95%. The modern homes 11 and the older homes 11 with updated electrical infrastructure resulted in similar performance results. The updated electrical systems 12 in these homes 11 were accompanied with an overall remodel of the home 11 which tends to include the addition of electrical outlets and lighting. The single family home 11 that exhibited a significantly lower accuracy (Home 8) was an older home 11 with an updated electrical system 12. However, that home 11 had a two phase electrical system, 12 which we only learned after installing the power line positioning system. Because it is a small home 11 and electrical phase one drives a small number of outlets, we simply placed the modules 13 on electrical phase two to produce acceptable (though not optimal) coverage throughout the home 11. However, it is anticipated that installing a simple phase coupler to couple some of the positioning signal from electrical phase one to electrical phase two would have improved its performance.

Condominium and apartment test cases also produced promising results. The condominium was converted from an office building, but the electrical system 12 was completely remodeled to a residential style system. Although one wall of the condominium used a metal conduit to run its electrical wire, the power line positioning system still worked because the room with the conduit was small and the receiver was never too far from the wall. The apartment also featured a similar residential style electrical system. Because of the small size of the living spaces, we had to turn down the power of the modules significantly in the two cases, unlike the larger homes 11 that were tested.

Older homes 11 without an updated electrical system 12 exhibited lower results for two reasons. First, these homes 11 lack a proper electrical ground, resulting in one less path for the signal to propagate, because the signal was sent both on the hot and ground wires. Homes 11 with an updated electrical system 12 have an extra electrical ground wire running through the home 11, which is usually grounded to the copper water pipes. This grounding enables additional signal propagations to certain areas of the home. Second, these homes 11 tended to have fewer electrical outlets than the modern or remodeled ones, resulting in poor detection in some areas.

Figure 6:
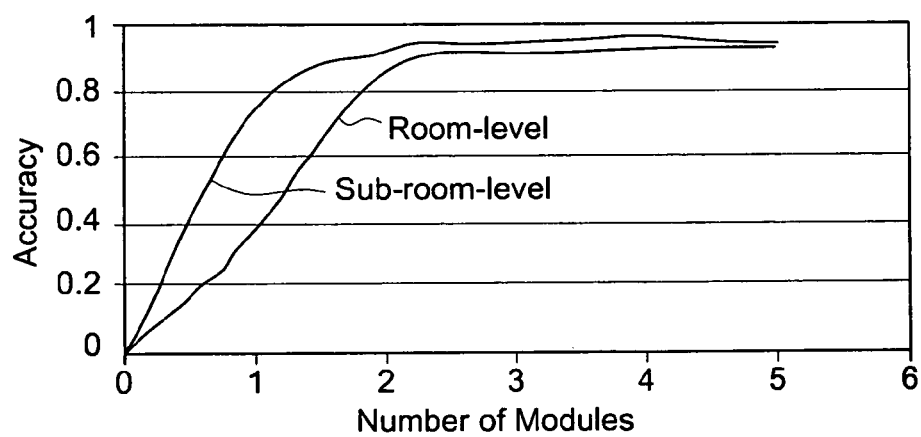
FIG. 6 is a graph that illustrates the effect of number of modules on room-level and sub-room-level classification accuracies.
Figure 7A:
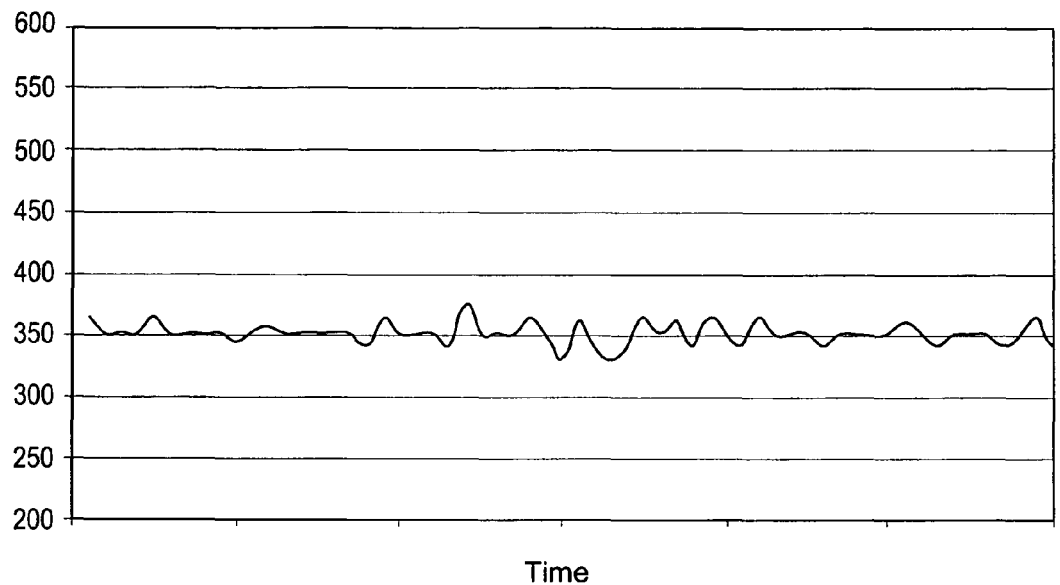
FIGS. 7a-7d illustrate temporal signal stability in a kitchen area of Home 2.
Figure 7B:
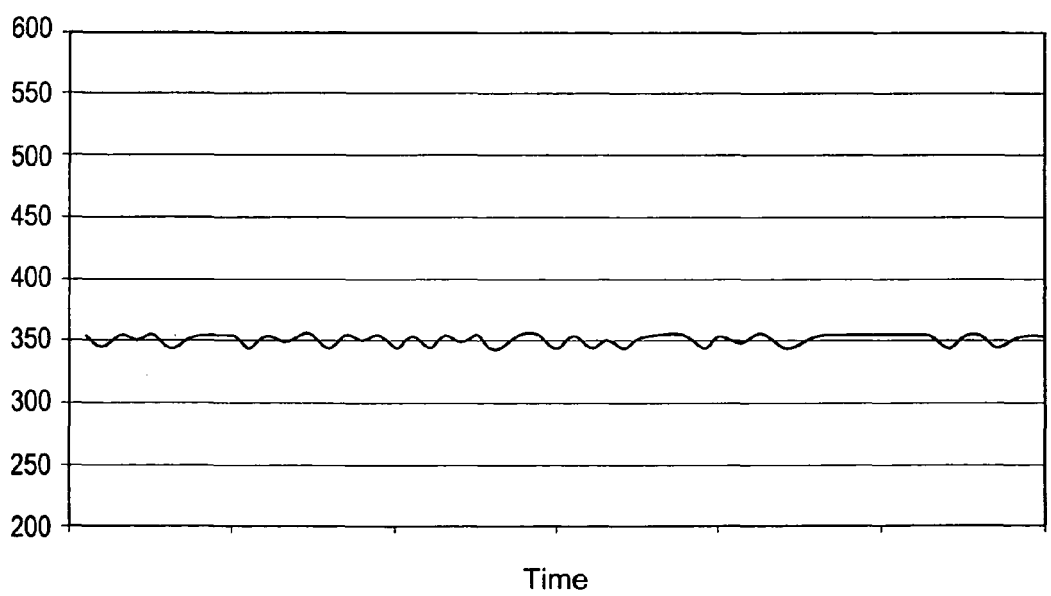
Figure 7C:
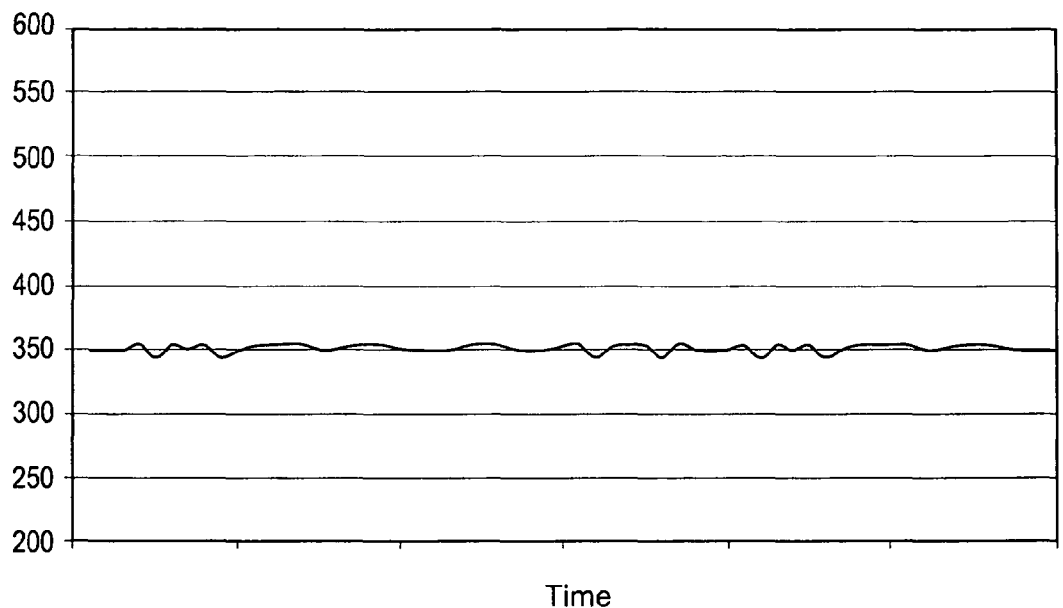
Figure 7D:
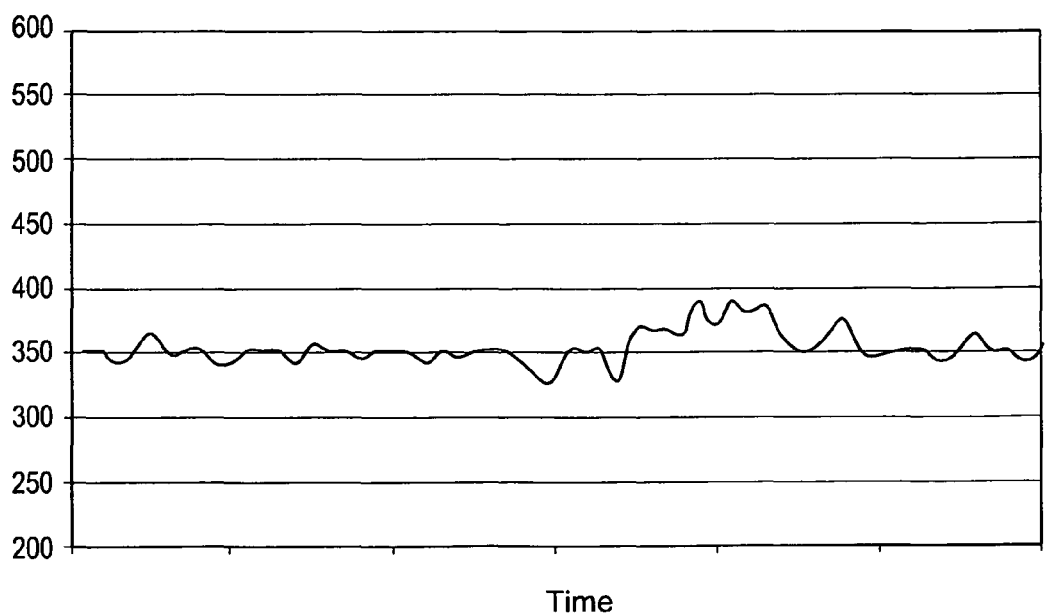

Table 2 shows accuracy results for each home 11. For each home 11, the accuracy of room-level prediction and the average sub-room-level prediction across all rooms are reported. The sub-room-level regions where defined to be approximately a 34 meters square. The WiFi and GSM measurements indicate the maximum number of access points or towers seen at all times during the surveying and the total number of unique access points or towers seen during the whole surveying period.

accuracy. FIG. 6 shows temporal signal stability in the kitchen area of Home 2. The graphs show the signal values for the two transmitting modules 13 (combined using the Euclidean distance) over various intervals during four days of continuous recording. The average signal values and the standard deviations are shown above each graph.

FIG. 6 shows both room-level and sub-room level accuracies for an increasing number of modules 13 for a particular home as an example. Additional modules 13 do increase the accuracy for both predictions, but there is a point of diminishing returns. For this home 11 (Home 1) two or three modules 13 are the best number. Similar trends were observed in other homes 11 that were tested and generally, two modules 13 were sufficient.

Resolution

In the initial evaluation, rooms were sub-divided into approximately 34 meter regions. This subdivision yielded high classification accuracies typically around 90%. Higher resolution, or smaller subdivisions of each room, is possible, but at the cost of classification accuracy. In addition, higher resolution also requires a more dense mapping of an area. To investigate the specific accuracy to resolution tradeoff, a fine-grain survey (sampling down to every 0.5 meter for a total of 96 samples) of a room (6 m×6 m) in Home 1 was performed. With the current implementation, the best obtainable practical resolution is 1 meter. The accuracy falls below 70% for 1 meter regions (see Table 3), because there is a theoretical limit to the detectable differences between small movements in the space and the signal. From observation, the maximum signal differential is about 20 units when moved 1 meter for a modern home 11.

Table 3 shows the sub-room-level accuracies for smaller sub-regions for a particular room in home 1. A total of 96 points were surveyed.

TABLE 2

| Home | Size Sq Ft/ Sq M | Sample points | Rooms surveyed | Room Accuracy at 3-4 m | Sub-Room Accuracy | WiFi Always/ Max | GSM Always/ Max |
| --- | --- | --- | --- | --- | --- | --- | --- |
| 1 | 4000/371 | 194 | 13 | 89% | 92% | 3/12 | 3/5 |
| 2 | 5000/464 | 206 | 15 | 95% | 93% | 1/3 | 2/4 |
| 3 | 1300/120 | 95 | 6 | 90% | 90% | 3/7 | 4/12 |
| 4 | 2600/241 | 183 | 11 | 88% | 87% | 1/3 | 3/5 |
| 5 | 2600/241 | 192 | 10 | 92% | 93% | 2/4 | 3/6 |
| 6 | 1000/93 | 76 | 5 | 100% | 94% | 0/2 | 4/6 |
| 7 | 800/74 | 65 | 5 | 93% | 95% | 2/11 | 3/9 |
| 8 | 1100/102 | 80 | 7 | 78% | 88% | 2/6 | 3/7 |

Classification Errors

Figure 5:
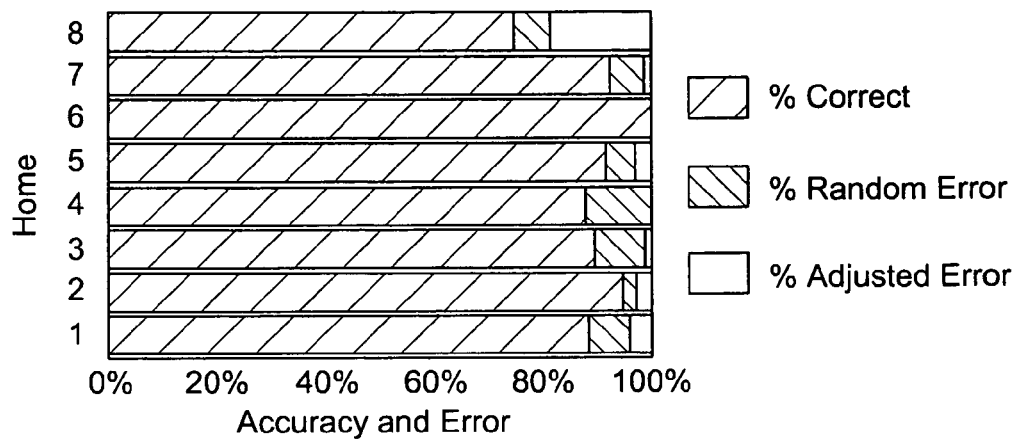
FIG. 5 illustrates the percentage of incorrect room predictions identifying a room that is adjacent to the correct room.

To understand the types of classification errors encountered by the power line positioning system 10, the confusion matrices for each home 11 were analyzed. For some homes 11, most of the classification errors resulted from misclassifying rooms as one of the adjacent rooms. The adjacency errors appeared when trying to localize very near the boundary or the wall of a room. These errors were more prevalent in larger homes 11 near common walls between two adjacent rooms of similar size. Open spaces that were divided into multiple rooms also resulted in errors. Other homes 11, however, exhibited more random classification errors possibly due to errors in the survey map, sparse sampling, or in error readings coming from the receiver at that time. One possible solution to guard against miss classifications is to use hysteretic data to compare against certain classifications and see if those classifications follow a valid trail. Some homes 11 could benefit from hysterics, especially those with significant random error (see FIG. 5). FIG. 5 is a graph that shows the percentage of incorrect room predictions identifying a room that is adjacent to the correct room.

Number of Modules and Performance

Accuracy tests were conducted using a varying number of modules 13. Although the goal was to minimize the additional hardware the user must install in a home 11, there might be cases in which higher accuracy is more desirable. Adding additional modules 13 is a primary way to increase overall

TABLE 3

| | Sub-room region size | | | | |
| --- | --- | --- | --- | --- | --- |
| | 4 m | 3 m | 2 m | 1 m | 0.5 m |
| % Accuracy | 94% | 91% | 74% | 67% | 42% |

Temporal Signal Stability

Fingerprinting works best with a signal that is time-independent but spatially diverse. The data presented so far only considered results over relatively short periods of time, usually around an hour's worth of data collected at a particular home 11. To test the stability of the signals over time, two separate tests were conducted. First, in Home 1, we conducted separate surveys over the course of several weeks. The system 10 was trained on data from one survey and checked its accuracy against data collected from different surveys.

Room prediction was correct 88% of the time (compared with the value of 89% for Home 1 in Table 3) and sub-room level prediction was correct 89% of the time (compared with the value of 90% in Table 3). Second, in Home 2, 45 hours of data was collected over a three-day period (Saturday through Monday) in a single location (the kitchen). The kitchen is interesting because it contains a large number of features that could affect the transmitted signals (plentiful overhead lighting, appliances being turned on and off throughout the day, talking on a cordless phone, and people gathering around the tag). FIGS. 7a-7d depict the stability of the signal for four different 3-hour intervals. The results suggest there is deviation (17 units on average), but it is not significant enough to cause major classification errors.

Modifications to the electrical infrastructure can contribute to accuracy errors and require recalibration, a problem we noted for other infrastructure solutions (802.11 and GSM). However, most situations such as turning on a light only energize a portion of the electrical line and do not affect significantly the accuracy in our experience. Construction of a "day" and "night" map using a richer data set can allay some of these concerns. The addition of an extension cord may impact the accuracy, depending on location and length. The power line positioning system 10 may be designed to recognize potential changes in the infrastructure from hysteretic data to notify the user that re-surveying of a particular area is necessary.

Although no problems were observed regarding electrical interference with continuous logging, electrical interference caused by home electronics and appliances was observed, such as from computers, televisions, and stereos. When the receiver was held next to some of these electronic devices, its broadband electrical noise often overwhelmed the receiver and caused spurious readings. This problem only existed when the receiver was very close (within a few centimeters) of such devices. To guard against learning or localizing incorrect fingerprints, one solution is to look for these signal interferences and filter out those readings, indicated by a clear broadband signature, before using the data in analysis.

The power line positioning system 10 is very promising as an inexpensive and reliable sub-room-level indoor positioning service. In this section, we investigate the viability of this system and offer some comparison to previous solutions.

Infrastructure and Cost Comparison Against WiFi and GSM

The cost of infrastructure for WiFi is distributed across a community and assuming dense enough living conditions, it is a reasonable expectation a single residence will be able to leverage other access points nearby. This is less likely in sparser housing, in which case users would be required to purchase multiple WiFi access points. The cost of the infrastructure for GSM is covered by various cellular telephony service providers. The coverage is fairly dense in most metropolitan areas and will only get better over time. However, coverage is still fairly sparse in rural settings and many homes do not get very good cellular service in some rooms (see Table 2). Almost every home in the U.S. has electrical power and it is an assumed cost of the homeowner to maintain this infrastructure over the lifetime of the home. Thus, the infrastructure is already available and usually well maintained.

One key advantage of leveraging the power line infrastructure 12 is user control of the infrastructure 12. Users have very little control of the parameters of GSM cellular towers or a neighbor's WiFi access point, thus changes can happen unexpectedly. In contrast, users have control of the power line infrastructure 12. Furthermore, there is stability in signal propagation over this infrastructure 12.

The cost and power requirements of the location tags 14 favors that of the power line positioning system 10 because of its simple sensing requirements, whereas as opposed to the more sophisticated chipset associated with GSM and WiFi reception. In addition, the cost of the transmitting module or device 13 would also be less expensive than buying additional access points if one were investing in a location system for the home 11.

The Power Line Infrastructure

In the United States, modern homes 11 follow a strict electrical code called the National Electronic Code (NEC). Electrical codes only became widely enforced in the 1980s, although many homes before that already followed similar guidelines. Although the specific regulations may change depending on state and city ordinances, each follows the same general requirements. These regulations ensure the electrical systems are consistent across homes 11 of different sizes and styles. Specifically, the requirements outlined in the NEC favor the infrastructure requirements needed for the power line positioning system 10 to work in modern homes 11. These requirements include regulations for certain "home run" circuits through the home 11, a minimum number of outlets in a given space, and minimum lighting requirements throughout the home. Although the power line positioning system already performed reasonably well in older homes 11, it consistently achieved very good results in the new or remodeled homes 11 that follow these requirements (see Table 3).

The power line positioning system 10 was developed to provide an affordable location system for home environments. However, commercial buildings must comply with strict electrical codes for which the power line positioning system 10 must be altered to support. First, commercial wiring typically uses a two or three phase electrical system which prevents the signals from propagating throughout the entire electrical system. This problem is solved by installing an inexpensive phase coupler to couple transmitted signals back and forth among electrical phases. Second, most commercial electrical wiring runs through a metal conduit, which blocks significant portions of the tune emanating from the wire. One solution to this problem is to greatly increase the signal strength and the other is to send the signal both through electrical wiring and the metallic conduit itself. This problem also applies to homes 11 that have been converted from commercial buildings without remodeling the electrical system 12.

General Comparison of the Power Line Positioning System with 802.11 and GSM

The significant advantage of PLP when compared against two popular fingerprinting techniques using WiFi/802.11 and GSM lies in the better resolution, control of the infrastructure and power requirements (see Table 4). Table 4 shows an overall comparison of PLP against two popular location systems that also use fingerprinting.

TABLE 4

| | PLP | GSM | WiFi |
|---|---|---|---|
| Output Type | symbolic | symbolic | symbolic(geometric Using triangulation |
| Resolution and Accuracy | 3-4 m - 90% 1 m - 67% | 20 m - 90% 2-5 m - 50% | 6 m - 90% 2-3 m - 50% |
| Infrastructure Requirements. | 2 plug-in signal modules | Located within GSM cellular service range | 3-4 WiFi access points |
| Infrastructure Control | Full | No | Partial (dependent on ownership of access points) |
| Spectral Requirements | 10 kHz-500 kHz | 900 MHz and 1800 MHz | 2.4 GHz |
| Update Rate | >20 Hz | >20 Hz | >20 Hz |
| Tag power Req. | ~50 mA (Pie + op-amp + antenna) | ~200 mA (GSM receiver module | ~100 mA (μcontroller) operated will detector |
| Simultaneous tracking | Theoretically no limit | Theoretically no limit | Theoretically no limit |

The power line positioning system 10 is an indoor positing system for the home 11 or business that leverages its power line infrastructure 12 and requires only the addition of two plug-in modules 13 to the electrical infrastructure 12 and using simple location tags 14. The system 10 is capable of localizing to sub-room level precision using a fingerprinting technique on the amplitude of signals produced by the two modules 13 installed in extreme locations of the home 11. The density of electrical wiring at different locations throughout the home 11 provides a time-independent spatial variation of signal propagation.

The experimental validation in eight different homes 11 identified the following advantages of the power line positioning system 10 over current indoor location solutions. (1) The power line positioning system 10 leverages a truly ubiquitous resource, the power line infrastructure 12, available in almost all homes 11. (2) The power line positioning system 10 requires minimal additions to the infrastructure 12 (two plug-in modules 13). (3) The power line positioning system 10 achieves superior sub-room-level classification, with an accuracy of 93% on average at a resolution of 34 meters. (4) The power line positioning system 10 does not detract from the appearance of the home 11.

In addition, other spatially varying signal features may be incorporated into the power line positioning system 10, such as phase differences between the signals in addition to the amplitude to increase the accuracy of the power line positioning system in the fingerprinting process.

Thus, indoor location systems that employ power line positioning techniques have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. An apparatus for determining at least one location in a structure or proximate to the structure, the structure comprising an electrical power line infrastructure located in a structure, the apparatus comprising:

two or more first transmitters configured to couple to the electrical power line infrastructure, the two or more first transmitters further configured to inject at least two first electrical signals into the electrical power line infrastructure such that the electrical power line infrastructure emanates radiated energy from the at least two first electrical signals;

at least one positioning tag configured to wirelessly receive the radiated energy from the at least two first electrical signals in the electrical power line infrastructure; and a software module configured to receive first data about the radiated energy from the at least two first electrical signals, the software module is further configured to process the first data to determine a first location proximate to the electrical power line infrastructure of the at least one positioning tag, wherein:

the at least one positioning tag is not electrically coupled and is not physically coupled to the electrical power line infrastructure;

the at least one location comprises the first location; and the software module is configured to run on at least one of a computer or the at least one positioning tag.

2. The apparatus of claim 1, wherein:

the software module is further configured to process the first data to determine a room of the structure in which the at least one positioning tag is located; and the first location comprises the room.

3. The apparatus of claim 1, wherein:

the software module is further configured to process the first data to determine in a region of a room of the structure in which the at least one positioning tag is located; and the first location comprises the region of the room.

4. The apparatus of claim 1, wherein:

the at least one positioning tag is further configured to wirelessly transmit the first data to a wireless receiver.

5. The apparatus of claim 1, wherein:

the at least one positioning tag is further configured to generate a signal fingerprint based upon the radiated energy from the at least two first electrical signals; and the first data comprises the signal fingerprint.

6. The apparatus of claim 5, wherein:

the software module is further configured to process the signal fingerprint to determine the first location of the at least one positioning tag.

7. The apparatus of claim 5, wherein:

the software module is configured to process the signal fingerprint using a k-Nearest Neighbor classification to determine the first location of the at least one positioning tag.

8. The apparatus of claim 5, wherein:

the software module is further configured to associate the signal fingerprint with the first location at least partially based on at least one of: a predetermined location map or a database.

9. The apparatus of claim 5, wherein:
the signal fingerprint comprises at least one of:
- a signal strength of the radiated energy from the at least two first electrical signals;
- a relative phase difference between the radiated energy from the at least two first electrical signals; or
- a phase shift between the radiated energy from the at least two first electrical signals.

10. The apparatus of claim 1, wherein:
a first transmitter of the two or more first transmitters is configured to generate a second electrical signal at a first frequency and inject the second electrical signal into the electrical power line infrastructure;
a second transmitter of the two or more first transmitters is configured to generate a third electrical signal at a second frequency and inject the third electrical signal into the electrical power line infrastructure;
the first frequency is different than the second frequency; and
the at least two first electrical signals comprise the second electrical signal and the third electrical signal.

11. The apparatus of claim 1, wherein:
the two or more first transmitters are configured to couple to the electrical power line infrastructure by coupling to two or more electrical plugs of the electrical power line infrastructure.

12. A method of locating a first electrical device in a structure or proximate to the structure, the structure comprising an electrical power line infrastructure, the method comprising:
generating two or more first electromagnetic signals;
transmitting the two or more first electromagnetic signals over the electrical power line infrastructure of the structure to cause the electrical power line infrastructure of the structure to emit radiated energy from the two or more first electromagnetic signals;
wirelessly detecting the radiated energy from the two or more first electromagnetic signals in the electrical power line infrastructure using the first electrical device;
generating first data about the radiated energy from the two or more first electromagnetic signals wirelessly detected by the first electrical device; and
using a software module running on a processor to determine a first position of the first electrical device proximate to the electrical power line infrastructure using the first data about the radiated energy from the two or more first electromagnetic signals,
wherein:
the electrical power line infrastructure comprises one or more wires; and
transmitting the two or more first electromagnetic signals comprises:
electrically and physically transmitting the two or more first electromagnetic signals over the one or more wires of the electrical power line infrastructure of the structure to cause the one or more wires of the electrical power line infrastructure of the structure to emit the radiated energy from the two or more first electromagnetic signals.

13. The method of claim 12, wherein:
using the software module running on the processor to determine the first position further comprises:
using the first data about the radiated energy to determine a room in the structure where the first electrical device is located; and
the first position comprises the room.

14. The method of claim 12, wherein:
using the software module running on the processor to determine the first position further comprises:
using the first data about the radiated energy to determine a region of a room of the structure where the first electrical device is located; and
the first position comprises the region of the room.

15. The method of claim 12, wherein:
using the software module running on the processor to determine the first position comprises:
using a k-Nearest Neighbor classification to process the first data to determine the first position of the first electrical device.

16. The method of claim 12, further comprising:
generating two or more second electromagnetic signals;
transmitting the two or more second electromagnetic signals over the electrical power line infrastructure of the structure;
wirelessly detecting radiated energy from the two or more second electromagnetic signals in the electrical power line infrastructure using the first electrical device;
generating second data about the radiated energy from the two or more second electromagnetic signals; and
using the software module running on the processor to determine a second position of the first electrical device proximate to the electrical power infrastructure using the second data about the radiated energy from the two or more second electromagnetic signals.

17. The method of claim 12, wherein:
the first data comprises at least one of:
- a signal strength of the radiated energy from the two or more first electromagnetic signals;
- a relative phase difference between the radiated energy from the two or more first electromagnetic signals; or
- a phase shift between the radiated energy from the two or more first electromagnetic signals.

18. The method of claim 12, further comprising:
facilitating building of a signal map of the structure.

19. The method of claim 12, wherein:
generating the two or more first electromagnetic signals comprises:
generating a second signal of the two or more first electromagnetic signals with a first frequency; and
generating a third signal of the two or more first electromagnetic signals with a second frequency, the first frequency is different than the second frequency; and
transmitting the two or more first electromagnetic signals comprises:
transmitting the second signal of the two or more first electromagnetic signals over the electrical power line infrastructure of the structure; and
transmitting the third signal of the two or more first electromagnetic signals over the electrical power line infrastructure of the structure.

20. The method of claim 12, further comprising:
generating two or more second electromagnetic signals;
transmitting the two or more second electromagnetic signals over the electrical power line infrastructure of the structure;
wirelessly detecting radiated energy from the two or more second electromagnetic signals in the electrical power line infrastructure using the first electrical device;
generating second data about the radiated energy from the two or more second electromagnetic signals; and
processing the second data to generate a location map associating the second data with at least one location proximate to the electrical power line infrastructure.

21. The method of claim 12, wherein:
using the software module running on the processor to determine the first position of the first electrical device comprises
using the software module running on the processor in the first electrical device to determine the first position of the first electrical device proximate to the electrical power line infrastructure using the first data about the radiated energy from the two or more first electromagnetic signals.

22. The method of claim 12, wherein:
using the software module running on the processor to determine the first position of the first electrical device comprises
using the software module running on the processor in a computer to determine the first position of the first electrical device proximate to the electrical power line infrastructure using the first data about the radiated energy from the two or more first electromagnetic signals; and
the computer is independent and different from the first device.

23. An indoor location system configured to be used to identify the location of at least one receiving device in a building or proximate to the building, the building comprising one or more electrical power lines and two or more electrical outlets electrically coupled to the one or more electrical power lines, the indoor location system comprising:
a first transmitter configured to electrically couple to a first electrical outlet of the two or more electrical outlets and further configured to inject at least one first electrical signal with a first frequency into the one or more electrical power lines via the first electrical outlet;
a second transmitter configured to electrically couple to a second electrical outlet of the two or more electrical outlets and further configured to inject at least one second electrical signal with a second frequency into the one or more electrical power lines via the second electrical outlet, the second frequency is different than the first frequency;
at least one receiving device configured to wirelessly receive one or more first electromagnetic waves radiated by the one or more electrical power lines, the one or more first electromagnetic waves are created from the at least one first electrical signal and the at least one second electrical signal; and
a software module configured to determine a location of the at least one receiving device in a region of a room of the building using a signal fingerprint of the one or more first electromagnetic waves,
wherein:
the first transmitter is configured to inject the at least one first electrical signal and the second transmitter is configured inject the at least one second electrical signal such that the one or more electrical power lines radiate the one or more first electromagnetic waves;
the at least one receiving device is not electrically or physically coupled to the one or more electrical power lines;
the software module is configured to run on at least one of the at least one receiving device or a base station;
the software module is further configured to at least partially create a signal map of the building;
the software module is further configured to communicate with a user as part of the creation of the signal map of the building;
the at least one receiving device comprises a signal detector; and
the signal fingerprint comprises at least one of:
a signal strength of the one or more first electromagnetic waves;
a relative phase difference between the one or more first electromagnetic waves; or
a phase shift between the one or more first electromagnetic waves.

24. The indoor location system of claim 23, wherein:
the base station comprises a computer.

* * * * *